METHODS OF AND APPARATUS FOR FORMING LEADS OF ARTICLES

Filed May 29, 1968 3 Sheets-Sheet 1

INVENTOR
W. W. HUDSON
BY [signature]
ATTORNEY

June 2, 1970 W. W. HUDSON 3,515,175

METHODS OF AND APPARATUS FOR FORMING LEADS OF ARTICLES

Filed May 29, 1968 3 Sheets-Sheet 2

June 2, 1970 W. W. HUDSON 3,515,175

METHODS OF AND APPARATUS FOR FORMING LEADS OF ARTICLES

Filed May 29, 1968 3 Sheets-Sheet 3

3,515,175

METHODS OF AND APPARATUS FOR FORMING LEADS OF ARTICLES

William W. Hudson, Columbus, Ohio, assignor to Western Electric Company, Incorporated, New York, N.Y., a corporation of New York Filed May 29, 1968, Ser. No. 733,030
Int. Cl. B21f *1/00, 45/00*
U.S. Cl. 140—1 16 Claims

ABSTRACT OF THE DISCLOSURE

Intermediate and free-end portions of leads which extend perpendicularly from a common side of a body of a semiconductor device and in a parallel relationship with each other are spread at acute angles with respect to the axis of the body and away from each other. Thereafter, the end portions of the leads are formed in a direction parallel with and spaced from the axis of the body and are cut to a predetermined length. Each lead is thereby formed with parallel end portions spaced and connected by an acutely formed intermediate portion.

Initially, the leads of the semiconductor device are positioned over a free end of a forming rod and a fanning sleeve is moved over the rod toward the leads so that a tapered end of the sleeve fans the intermediate and free end portions of the leads outwardly at an acute angle. Thereafter, a forming and cutting die is moved engagingly along the leads so that the intermediate portions of the leads conform to the taper of the end of the sleeve. As the die continues to move along the leads, the free end portions of the leads are urged into associated grooves formed in the outer surface of the sleeve where a shoulder in each groove cooperates with the die to pinch and sever the free end portions of the leads to a predetermined length.

BACKGROUND OF THE INVENTION

Field of the invention

This invention relates to methods of and apparatus for forming leads of articles and particularly to methods of and apparatus for the offset forming and cutting to a predetermined length of leads of semiconductor devices.

Description of the prior art

In the manufacture of printed wiring boards, terminating land areas, which are associated with various circuits of printed wiring on the boards, must be spaced sufficiently to prevent shorting between adjacent circuits. Subsequently, leads of electrical components, such as transistors, are inserted through holes in an associated printed wiring board and are clinched and bonded to land areas of associated circuits of the printed wiring supported on the board.

Due to the relatively small size of the transistors, the leads of the transistors are usually confined to a small area which is less than the area required for the spacing of the land areas of the associated circuits supported on the board. Therefore, the leads of the transistor should be formed in such a manner that free ends of the leads can be assembled readily with the board and clinched and bonded easily to the land areas of the associated circuits.

Frequently, printed wiring boards expand and contract in environmental use and cause stresses to be exerted on the leads of the transistors. If each transistor is assembled with the printed wiring board so that the body of the transistor is resting on one surface of the board, the frequent expansion and contraction of the board could cause the leads of the transistor to separate undesirably from the body of the transistor. To prevent the undesirable separation from occurring, the leads of the transistors are formed in such a way that the body of the transistor is spaced normally from the adjacent surface of the printed wiring board so that the leads provide flexibility of movement for the assembled transistor whereby the leads are permitted to move with the expanding and contracting movement of the board. The stresses exerted upon the leads is more evenly distributed along the length of the leads and relatively less stress is exerted upon the portions of the leads immediately adjacent to the body of the transistor.

When the transistor is operating normally, heat is generated. It is important in the operation of the associated circuit that the heat be dissipated quickly. Therefore, the leads of the transistor should be formed to permit the body of the transistor to be spaced from the adjacent surface of the associated printed wiring board so that the generated heat may be dissipated easily.

Some transistors are enclosed in a glass enclosure with the leads of the transistors extending outwardly from the glass. When the leads of the transistors are formed prior to assembly with the printed wiring boards, the portions of the leads immediately adjacent to the glass enclosure should not be moved relative to the body of the transistor to prevent the glass enclosure from being damaged. In addition, the leads of the transistors are frequently too long and should be clipped to a predetermined length to facilitate assembly of the transistors with the associated printed wiring boards.

Due to the relatively small size of the leads of the transistors and the presence of the glass enclosure, a tedious and time consuming operation is normally required to form the leads to the desired shape and to further cut the leads to a predetermined length.

The problems of forming and cutting the leads of transistors and the like becomes more critical when the leads of the transistor extend in a spaced, parallel relation from a common side of the body of the transistor. For example, three adjacent, spaced, parallel leads extend from one side of the body of many types of transistors which are presently manufactured.

Conventional facilities for clamping the leads to be formed and for subsequently bending the leads about an anvil present handling and positioning problems when used for forming the leads of types of transistors having all of the leads extending from one common side thereof. Additionally, the forming of the leads, required to support the body of the transistor spatially from the adjacent surface of the printed wiring board and to provide flexibility of movement of the leads with the expansion and contraction of the board, cannot be accomplished with conventional techniques and facilities which are designed for articles, such as resistors, having leads extending axially from opposite ends thereof.

SUMMARY OF THE INVENTION

It is therefore an object of this invention to provide new and improved methods of and apparatus for forming leads of articles.

Another object of this invention is to provide new and improved methods of and apparatus for forming leads of articles and cutting the leads to predetermined lengths.

Still another object of this invention is to provide new and improved methods of and apparatus for supporting an article while leads which extend from the articles are being formed and cut to prevent the damaging of portions of the articles.

A further object of this invention is to provide new and improved methods of and apparatus for forming of leads of articles so that the articles may be assembled and supported in a spaced relation with a supporting structure to which leads are secured.

A still further object of this invention is to provide methods of and apparatus for the forming of leads which extend from one side of an article so the article can be supported in a spaced relation from a supporting structure.

A method of forming leads of articles in accordance with certain principles of the invention may include the steps of fanning free end and intermediate portions of the leads in a desired angular displacement with respect to attached end portions of the leads adjacent to the body of the article, while confining the attached end portions, forming free end portions of the leads with respect to the intermediate portions thereof so that when the stresses are exerted on the free end portions of the leads the stresses are absorbed primarily by the intermediate portions of the leads rather than being transmitted to the attached end portions of the articles. Extreme ends of the free end portions of the leads of the article may then be severed to provide formed leads of a predetermined length.

An apparatus for forming the leads of an article in accordance with certain principles of the invention may include means for confining end portions of leads of an article which are adjacent to the body of the article so that the attached end portions cannot be moved laterally, means for fanning intermediate and free end portions of each lead to a predetermined angular displacement with respect to the attached end of the associated lead and means for forming the free end portion of each lead to a predetermined angular displacement with respect to the intermediate portion of the associated lead so that stresses exerted on the free end portions of each lead of the article are absorbed primarily by the angularly displaced, intermediate portion of the associated lead to preclude substantially the transmittal of the stresses to the attached end portions of the associated lead. Means are provided for severing extreme ends of the free end portions of each lead to provide leads of a predetermined length.

BRIEF DESCRIPTION OF THE DRAWING

Other objects and advantages of the present invention will be apparent from the following detailed description when considered in conjunction with the accompanying drawings in which.

DETAILED DESCRIPTION

Figures 1, 2, 3:
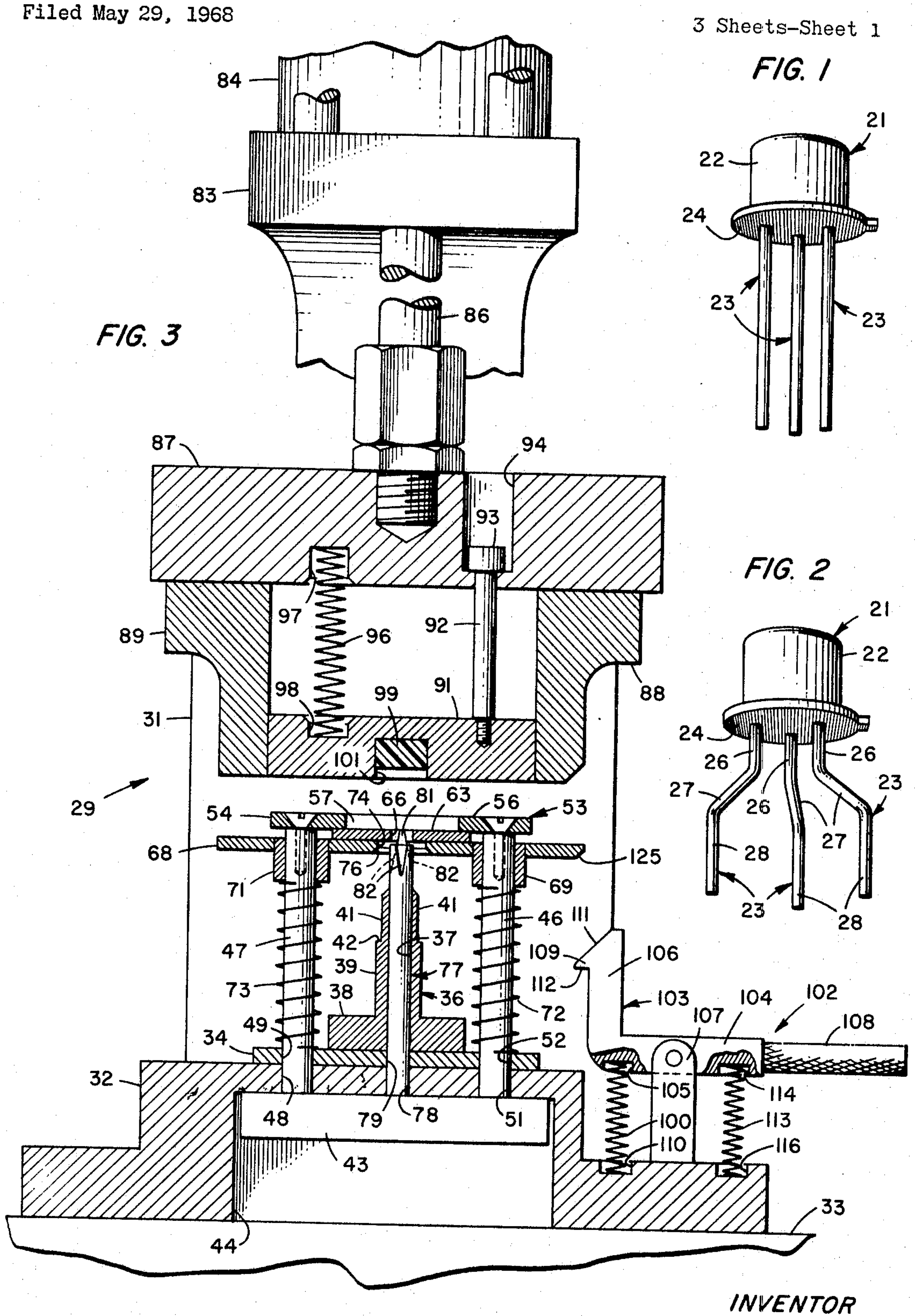
FIG. 1 is a perspective view of a semiconductor device having straight, parallel leads extending perpendicularly from a base thereof.
FIG. 2 is a perspective view of a semiconductor device, such as that shown in FIG. 1, having leads formed in accordance with certain principles of the invention.
FIG. 3 is a front, sectional view showing an apparatus in an upoperated position for forming and cutting leads of an article in accordance with certain principles of the invention.

Referring now to FIGS. 1 and 2, there is shown in FIG. 1 a transistor, designated generally by the numeral 21. The transistor 21 includes a body 22 and three, parallel, spaced terminals, designated generally by the numeral 23—23, which extend perpendicularly from one side 24 of the body. The leads 23 of the transistor 21 illustrated in FIG. 2 have been formed and cut so that each lead includes an attached end portion 26, which is attached to the body 22 of the transistor. Each of the leads 23—23 also includes an intermediate portion 27 which is formed at an angle with respect to the attached end portion 26 thereof and which extends away from the axis of the body 22 of the transistor 21. Free end portions 28—28 of each of the leads 23—23 extend angularly from the associated intermediate portions 27—27 thereof. The axis of the free end portion 28 of each of the leads 23—23 is substantially parallel with and spaced from the axis of the associated attached end portion 26 thereof. Extreme ends of the leads 23—23 have been cut from the end portions 28—28 thereof to provide formed leads of a predetermined length.

The end portions 28—28 of the leads 23—23 can now be assembled with and connected to land areas (not shown) of printed wiring circuits (not shown) which have a larger spacing than the spacing between the attached end portions 26—26 of the leads. Additionally, the angular displacement of the intermediate portions 27—27 of the leads 23—23 permits the body 22 of the transistor 21 to be spaced from an adjacent surface of a supporting printed wiring board to facilitate evenly distributed heat dissipation for efficient circuit operation. Also, by locating spatially the body 22 of the transistor 21 with respect to the adjacent surface of the printed wiring board, the leads 23—23 of the transistor are permitted to move with expansion and contraction of the board due to environmental temperature changes. If the body 22 of the transistor 21 had been placed directly on the adjacent surface of the printed wiring board the attached end portions 26—26 of the leads 23—23 could be loosened and detached from the associated secured connection within the body of the transistor.

The active components (not shown) of the transistor 21 are sealed within a glass enclosure (not shown) within the body 22. The attached ends 26—26 of the leads 23–23 extend through the glass enclosure and through the side 24 of the body 22 of the transistor 21. If the leads 23—23 of the transistor 21 are bent and formed immediately adjacent to the side 24 of the body 22, the glass enclosure may be damaged or cracked due to the bending of the leads. Therefore, the attached end portions 26—26 of the leads 23—23 are not bent during a forming operation but remain straight in the original orientation. Additionally, when stresses are exerted on the free end portions 28—28 of the leads 23—23 during handling and assembly operations, the stresses are absorbed substantially by the angularly displaced, intermediate portions 27—27 of the leads by flexing to minimize possible damage to the glass enclosure within the body 22 of the transistor 21.

Referring to FIG. 3, there is shown an apparatus, designated generally by the numeral 29, for forming the leads 23—23 of the transistor 21 (FIGS. 1 and 2), which includes a stand 31 extending upwardly from a rear portion of a base 32 which is resting on a stationary platform 33. A support plate 34 is positioned on top of the base 32 and supports a fanning and cutting sleeve, designated generally by the numeral 36. The fanning and cutting sleeve 36 is formed with an axial bore 37, an enlarged base portion 38 and a sleeve portion 39 extending upwardly from the base portion. The upper end of the peripheral surface of the sleeve portion 39 is formed with grooves 41 having base shoulders 42 with the grooves being tapered inwardly parallel downwardly slightly with respect to the axis of the sleeve 36. The number of grooves 41, which are formed in the upper peripheral surface of the sleeve portion 39, corresponds to the number of leads 23—23 of the transistor 21 (FIGS. 1 and 2) to be formed and cut.

A support block 43 is located within an opening 44 formed in the underside of the base 32 and supports a pair of upwardly extending rods 46 and 47. The rod 46 extends through aligned openings 48 and 49 formed in the base 32 and the support plate 34, respectively, while the rod 47 extends through aligned openings 51 and 52 formed in the base and the support plate respectively.

Figures 4, 5, 6:
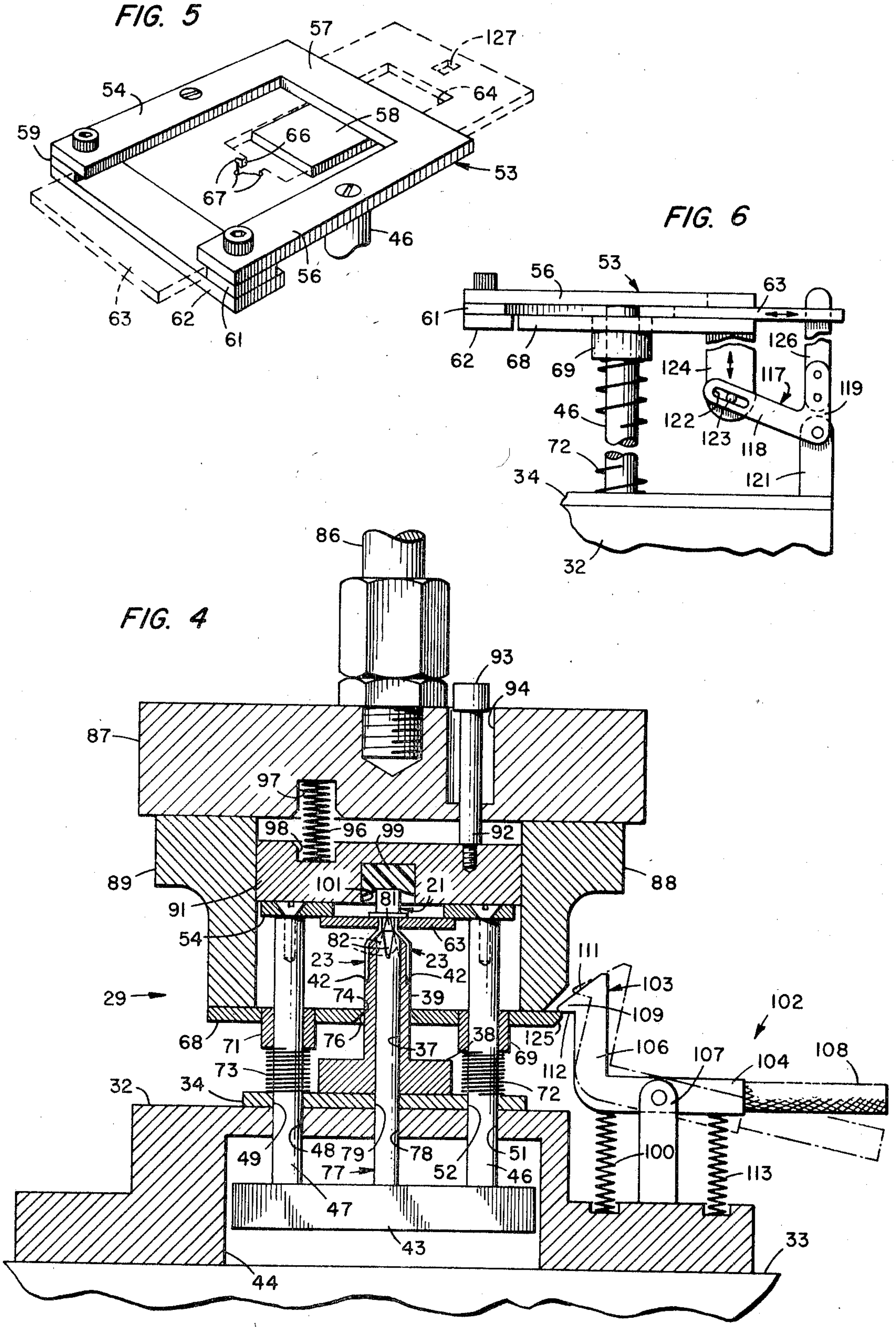
FIG. 4 is a front, sectional view of the apparatus of FIG. 3 showing the apparatus in the operated position.
FIG. 5 is a perspective view showing a shuttle mechanism of the apparatus of FIGS. 3 and 4 used in the forming and cutting of leads of an article.
FIG. 6 is a partial, side view showing a mechanism for moving the shuttle mechanism of FIG. 5 during a lead forming and cutting operation.

Referring to FIG. 5, there is shown a U-shaped shuttle-support member, designated generally by the numeral 53, which is provided with two side legs 54 and 56 and one base leg 57. A stop member 58 extends from the underside of the base leg 57 of the U-shaped member 53 in the same direction that the side legs 56 and 56 extend from the base leg.

A pair of spacers 59 and 61 are positioned adjacent to the underside of the free ends of the side legs 54 and 56, respectively, and provide a spacing between the free ends of the side legs and opposite ends of a shuttle support bar 62. The spacers 59 and 61 and associated ends of the support bar 62 are secured to the associated free ends of the side legs 54 and 56, respectively, of the U-shaped member 53.

Opposite side portions of the free ends of the side legs 54 and 56 overhang from the associated spacers 59 and 61, respectively, and provide a guide for a shuttle plate 63 (shown in phantom lines). The shuttle plate 63 is slidable along the underside of inner portions of the side legs 54 and 56 and portions of the underside of the base leg 57 of the U-shaped member 53. The shuttle plate 63 is formed with a central opening 64 which facilitates the movement of the plate with respect to the stop member 58. A cutout portion 66, which is formed in the shuttle plate 63, includes three spaced grooves 67—67 for guiding the leads 23—23 of the transistor 21 (FIGS. 1 and 2) into the forming apparatus 29 (FIG. 3).

Referring again to FIG. 3, there is shown intermediate portions of the side legs 54 and 56 of the U-shaped member 53 which are secured to the upper ends of the rods 46 and 47, respectively, so that the shuttle plate 63 is located centrally between the rods and under the U-shaped member.

A forming and cutting plate 68 is provided with a pair of bushings 69 and 71 which are positioned for sliding movement on the rods 46 and 47, respectively. A pair of compression springs 72 and 73 are positioned coaxially about the rods 46 and 47, respectively, and urge normally the forming and cutting plate 68 against the underside of the shuttle plate 63. The forming and cutting plate 68 is formed with a central opening 74 having a countersunk portion 76 facing downwardly.

A fanning rod, designated generally by the numeral 77, is mounted centrally on the upper surface of the support block 43 and extends upwardly through openings 78 and 79 formed in the base 32 and the support plate 34, respectively, and extends further through the bore 37 of the forming and cutting sleeve 36. The forming rod 77 is formed with a substantially tapered upper end 81 which tapers downwardly into three fanning slots 82—82 to accommodate the fanning of the three leads 23—23 of the transistor 21 (FIGS. 1 and 2). The tapered end 81 of the forming rod 77 extends through the cutout portion 66 of the shuttle plate 63 so that the grooves 67—67 (FIG. 5) of the cutout portion are aligned with the fanning slots 82—82.

The stand 31 extends upwardly and is formed with a horizontal overhanging portion 83 which supports an air cylinder 84 thereon. A rod, 86, which is connected at one end thereof to the air cylinder 84 for movement extends downwardly from the air cylinder and is connected to a press block 87. A pair of spaced, side blocks 88 and 89 are attached to and suspend from the press block 87. A clamping member 91 is mounted for sliding movement between the spaced, side blocks 88 and 89 and is attached to the threaded end of bolt 92. The bolt 92 is formed with a head 93 which is permitted to move in a counterbore 94 formed in the press block 87. It is noted that a plurality of bolts, such as the bolt 92, can be used to maintain the clamping member 91 movably secured to the press block 87.

Opposite ends of a compression spring 96 are located in aligned openings 97 and 98 in the press block 87 and the clamping member 91, respectively, to maintain normally the spacing between the press block and the clamping member. A plurality of compression springs, such as the compression spring 96, can be used to maintain the normal spacing between the press block 87 and the clamping member 91.

A resilient pad 99 is located in an opening 101 which is formed in the underside of the clamping member 91. The resilient pad 99 is contoured to conform substantially to the shape of the upper portion of the body 22 of the transistor 21 (FIGS. 1 and 2) and facilitates the clamping of the transistor during the forming of the leads 23—23 of the transistor.

Referring further to FIG. 3, there is shown a latch, designated generally by the numeral 102, which includes a bell crank, designated generally by the numeral 103, having a horizontally oriented leg 104 and a vertically oriented leg 106. The horizontal leg 104 of the bell crank 103 is mounted intermediately for pivotal movement to a bracket 107 which is secured to the base 32. The leg 104 supports a handle 108 which extends horizontally from the free end thereof. Opposite ends of a compression spring 100 are positioned in associated openings 105 and 110 which are formed in the horizontal leg 104 of the bell crank 103 and the base 32, respectively, to urge normally the latch 102 in a clockwise direction.

One side of the upper end of the vertical leg 106 of the bell crank 103 is formed with a camming and latching projection 109 having a bevelled surface 111 and a shoulder 112. Opposite ends of a compression spring 113 are positioned in associated openings 114 and 116 which are formed in the horizontal leg 104 of the bell crank 103 and the base 32, respectively, to urge normally the latch 102 in a counterclockwise direction. The compression springs 100 and 113 counterbalance each other to maintain the bell crank 103 of the latch 102 substantially in the position shown in FIG. 3.

Referring to FIG. 6, there is shown a bell crank, designated generally by the numeral 117, which includes a first leg 118 and a second leg 119 and is secured intermediately for pivotal movement to a bracket 121, which is mounted on the base 32. The leg 118 of the bell crank 117 is formed with a longitudinal slot 122 near the free end thereof. A camming pin 123 is mounted on a support member 124, which suspends from and is attached to the underside of the forming and cutting plate 68, and extends laterally from the support member into the slot 122 formed in the bell crank 117.

A linkage actuator 126 is secured at one end thereof to the free end of the leg 119 of the bell crank 117. The other end of the linkage actuator 126 extends through an opening 127 (FIG. 5) formed in a rear portion of the shuttle plate 63.

Referring to FIG. 3, the apparatus 29 is shown in a position for an operator to insert a transistor 21 (FIG. 1) into the apparatus prior to forming of the leads 23—23 of the transistor. Referring to FIG. 5, when the apparatus 29 is conditioned to receive the transistor 21, the shuttle plate 63 is resting in the rearwardmost position so that the edge of the opening 64 having the cutout portion 66 formed therein is in abutting engagement with the cantilevered end of the stop member 58. In this position, the cutout portion 66 of the shuttle plate 63 is located over the tapered end 81 of the fanning rod 77 and the grooves 67—67 of the shuttle plate are aligned with the associated fanning slots 82—82 formed in the tapered end of fanning rod.

Figure 7:
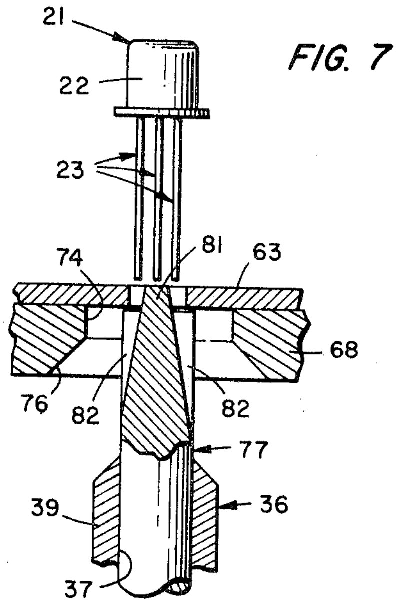
FIGS. 7 through 12 are diagrammatical views showing the various steps accomplished by the apparatus of FIGS. 3 and 4 in the forming of leads of an article, such as a semiconductor device, in accordance with certain principles of the invention.
Figure 8:
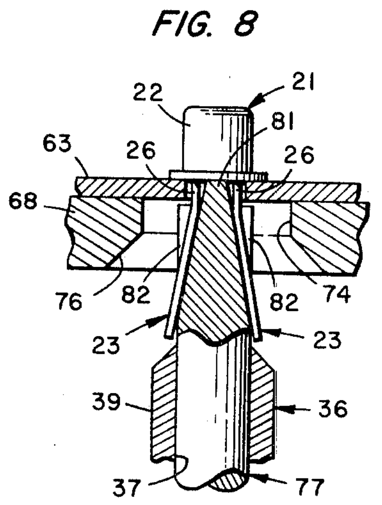

Referring to FIG. 7, the operator positions one of the transistors 21—21 over the cutout portion 66 of the shuttle plate 63 and the tapered end 81 of the fanning rod 77 and orients the transistor so that each of the leads 23—23 are aligned with an associated one of the grooves 67—67 (FIG. 5). Referring to FIG. 8, the operator moves the transistor 21 toward the cutout 66 of the shuttle plate 63 so that the leads 23—23 are guided into the associated grooves 67—67 (FIG. 5) and further into engagement with the associated fanning slots 82—82 of the fanning rod 77.

As the operator continues to move the transistor 21 downwardly, the free ends of the leads 23—23 follow the taper of the associated slots 82—82 until the body 22 of the transistor engages the tapered end 81 of the fanning rod. It is noted that the leads 23—23 are passed through a confining space which is defined by the grooves 67—67 of the shuttle plate 63 and the tapered end 81 of the fanning rod 77 so that, as successive free end and intermediate portions 28—28 and 27—27, respectively, of the leads are being spread due to engagement with the fanning slots 82—82, the portions of the leads passing through the confining space, while other portions of the leads are being formed, are precluded from lateral movement. In this manner, the leads 23—23 are formed at a first angular displacement which prepares the leads for a second spreading step without placing substantial stresses on the portions of the leads which are adjacent to the body 22 of the transistor 21 and the glass enclosure and without requiring positive gripping of any portions of the leads.

It is noted further that the attached end portions 26—26 of the leads 23—23 are confined subsequently within the confining space provided by the grooves 67—67 of the shuttle plate 63 and the tapered end 81 of the fanning rod 77 so that these portions of the leads are not bent and the glass enclosure is not damaged during subsequent forming and cutting operations. Additionally, the portions of the leads 23—23 which extend downwardly from the attached end portions 26—26 are spread apart for an initial fanning step to prepare the leads for a second fanning step. The operation of initially fanning the leads 23—23 of the transistor 21 permits the preparation of the leads for the further fanning thereof without subjecting the attached end portions 26—26 thereof to any critical stresses before the attached end portions are confined within the grooves 67—67 (FIG. 5) of the shuttle plate 63.

Referring to FIGS. 3 and 4, the operator actuates a control system (not shown) for the apparatus 29 to operate the air cylinder 84 so that the rod 86 moves downwardly to facilitate downward movement of the press block 87, the side blocks 88 and 89 and the clamping member 91. Since the clamping member 91 is held in a spaced relation with the press block 87 by the compression spring 96, the clamping member moves downwardly in this spacial relationship until the resilient pad 99 engages the body 22 of the transistor 21. At this time, the press block 87 and the side blocks 88 and 89 continue to be moved downwardly. The clamping member 91 begins to be moved relatively toward the press block 87 but still continues the downward movement. As the clamping member 91 moves relatively toward the press block 87, the head 93 of the bolt 92 is moved relatively upwardly through the bore 94 of the press block and the spring 96 begins to compress.

Even though the clamping member 91 is moving relatively toward the press block 87, there is sufficient downward force present to cause the clamping member to engage the U-shaped member 53 and to move the U-shaped member, the shuttle plate 66 and the forming and cutting plate 68 downwardly with the rods 46, 47 and 77 and the support block 43. As the U-shaped member 53 and the shuttle plate 63 move downwardly, the underside of the shuttle plate approaches the upper, bevelled end of the stationary forming and cutting sleeve 36.

Figure 9:
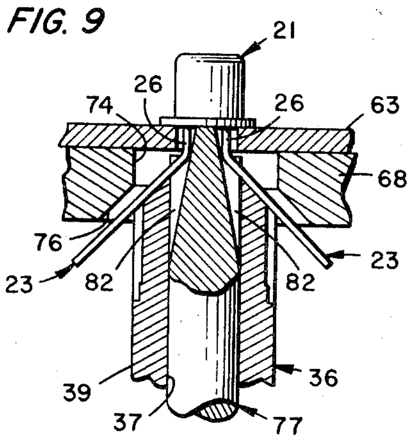

Referring to FIG. 9, eventually the leads 23—23 of the transistor 21 engage the upper bevelled end of the stationary forming and cutting sleeve 36 where, upon continued downward movement of the clamping member 91, the leads are spread further apart in the second fanning step. The angle to which the leads 23—23 are spread is established by the angle of the bevel of the upper bevelled end of the forming and cutting sleeve 36. It is noted that the attached end portions 26—26 of the leads 23—23 are still confined within the grooves 67—67 (FIG. 5) of the shuttle plate 63 so that the effects of stresses which are exerted on the fanned portions of the leads are minimized in the areas where the leads enter the glass enclosure.

Referring to FIGS. 3 and 4, eventually the downwardly moving clamping member 91, the U-shaped member 53 and the shuttle plate 63 cannot continue to move downwardly due to the presence of the stationary forming and cutting sleeve 36. However, the press block 87 and the side blocks 88 and 89 continue to move downwardly as the spring 96 compresses further and the head 93 of the bolt 92 moves upwardly relatively through the counterbore 94. The downwardly moving side blocks 88 and 89 engage the upper sides of the forming and cutting plate 68 and move the plate downwardly relative to the stationary clamping member 91, the U-shaped member 53 and the shuttle plate 63.

As the forming and cutting plate 68 is moved downwardly, the bushings 69 and 71 are moved axially downwardly over the rods 46 and 47, respectively, against the biasing force of the compressing springs 72 and 73, respectively. Also, as the forming and cutting plate 68 is moved downwardly, the countersunk portion 76 of the bore 74 engages the fanned portions of the leads 23—23 and starts to bend the leads downwardly.

Figure 10:
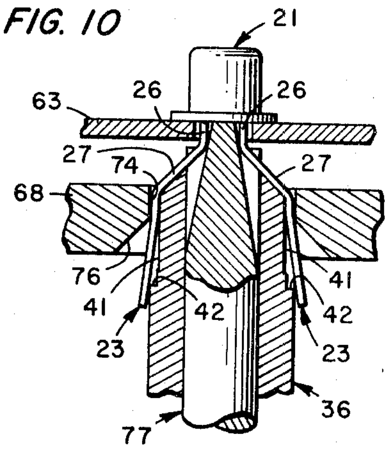

Referring to FIG. 10, as the forming and cutting plate 68 continues to be moved downwardly the bore 74 engages portions of the leads 23—23 and moves the portions into the slightly tapered grooves 41 formed in the forming and cutting sleeve 36.

Referring to FIG. 6, as the forming and cutting plate 68 is moved downwardly with respect to the shuttle plate 63, the camming pin 123 is moved downwardly within the slot 122 of the bell crank 117 to cause the bell crank to start to pivot. As the bell crank 117 starts to pivot the linkage actuator 126 is moved to initiate movement of the shuttle plate 63 so that the cutout portion 66 thereof is moved away from the clamped transistor 21 to facilitate subsequent removal of the transistor from the apparatus 29.

Figure 11:
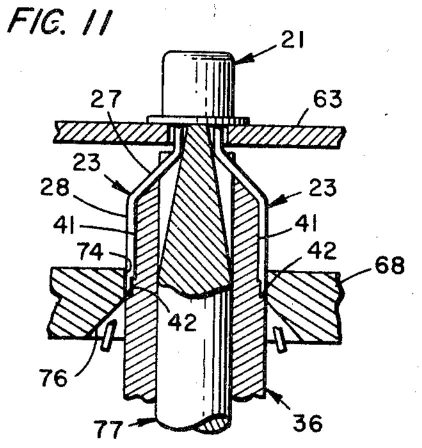

Referring to FIG. 11, the forming and cutting plate 68 is eventually moved past a position where the contiguous edge of the countersunk portion 76 and the bore 74 are moved adjacent to the shoulders 42 of the slightly tapered grooves 41 which are formed in the forming and cutting sleeve 36, so that the extreme ends of the free end portions 28—28 of the leads 23—23 are severed from the remaining portion of the leads. This operation cuts the formed leads 23—23 to a predetermined length while the body 22 of the transistor 21 and the attached end portions 26—26 of the leads are confined and facilitates the forming and cutting of the leads in one stroke of the apparatus 29. In addition, there is no handling of the transistor required by the operator during the forming and cutting operations after the transistor 21 has been inserted into the apparatus 29. Further, the slight inward taper of the grooves 41 permits the leads 23—23 to be overformed slightly to compensate for any inherent resiliency of the leads which normally tends to cause the end portions 28—28 of the leads to extend outwardly from the desired parallel orientation after the transistor 21 has been removed from the apparatus 29.

Figure 12:
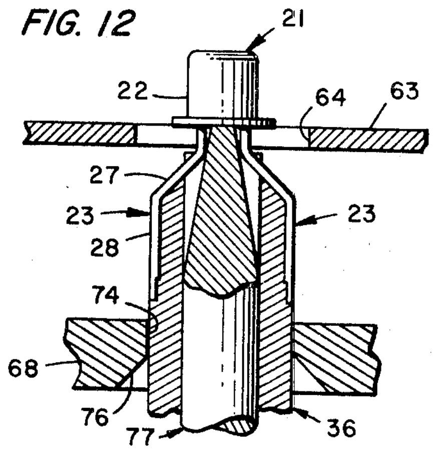

Referring to FIG. 12, the forming and cutting plate 68 is moved to a position where the upper surface of the plate passes the shoulders 42—42 of the grooves 41—41 to insure that any rough edges which may appear at the free ends of the leads 23—23 as a result of the severing operation will be removed.

Referring to FIG. 6, when the forming and cutting plate 68 has reached the lowermost position (FIG. 12), the bell crank 117 has been pivoted to move the shuttle plate 63 so that the cutout portion 66 is moved away from the stop member 58 (FIG. 5) to facilitate removal of the transistor 21. Referring to FIG. 12, the shuttle plate 63 is shown in a position where the plate has been moved to the rear and the opening 64 is now visible.

Referring to FIGS. 3 and 4, when the forming and cutting plate 68 is moved downwardly during the forming and cutting operation, a bevelled edge 125 of the plate engages the camming surface 111 of the latch 102 to pivot the latch counterclockwise. After the forming and cutting plate 68 has passed the projection 109 of the latch 102, the latch returns to a position as shown in FIG. 4 and the plate is locked eventually by the engagement of the bevelled edge 125 of the plate with the latching surface 112 thereof.

After the downward forming and cutting cycle is complete, the rod 86 is retracted upwardly and the press block 87 and the side blocks 88 and 89 are moved upwardly. However, the biasing force of the compression spring 96 holds down the clamping member 91 and the latch 102 holds down the forming and cutting plate 68 as shown in FIG. 4. Since the forming and cutting plate 68 is held down, the bell crank 117 (FIG. 6) remains in a position to keep the shuttle plate 63 in a position to facilitate the subsequent removal of the transistor 21 from the apparatus 29.

Subsequently, the head 93 of the bolt 92 moves downwardly relatively through the counterbore 94 of the press block 87 until the head engages the bottom of the counterbore. Thereafter, as the press block 87 is moved upwardly, the clamping member 91 is also moved upwardly to expose the previously clamped transistor 21 setting on the tapered end 81 of the fanning rod 77. The operator can then remove the transistor 21. Thereafter, the operator presses down on the handle 108 to release the latch 102 so that the forming and cutting plate 68 can return to the upper position. When the latch 102 is released, the biasing force of the compressed springs 72 and 73 cause the forming and cutting plate 68 to be moved to the normal rest position as shown in FIG. 3.

Referring to FIG. 6, when the forming and cutting plate 68 returns to the normal upper position, the pin 123 is moved upwardly and within the slot 122 of the bell crank 117 so that the shuttle plate 63 is moved to a position where the portion of the opening 64 having the cutout portion 66 is positioned in abutting engagement with the cantilevered end of the stop member 58 (FIG. 5) in preparation for the insertion of another transistor 21 into the apparatus 29.

It is to be understood that the above-described arwhich will embody the principles of the invention. Other arrangements may be devised by those skilled in the art which will embody the principles of the invention and fall within the spirit and scope thereof.

What is claimed is:

1. A method of forming leads extending from an article, which comprises the steps of:

supporting the portions of the leads which are attached to the article against lateral movement so that any stresses placed thereon are axial, spreading successive free end and intermediate portions of the leads to a first predetermined angular displacement with respect to the article so that a preliminary bend is formed only in and lateral stresses of spreading are applied only to the successive free end and intermediate portions of the leads in preparation for additional forming of the leads, spreading intermediate and free end portions of the leads to a second predetermined angular displacement with respect to the article whereby any lateral movement of the lead is limited to the intermediate and free end portions of the leads, and bending the free end portions of the leads to a predetermined angular displacement with respect to the associated intermediate portions of the leads so that the free end portions of the leads extend in a desired direction with respect to the article.

2. The method as set forth in claim 1 including the step of:

confining successive free end and intermediate portions of the leads against lateral movement, progressing from the free end portions of the leads toward the article, by causing relative movement of the leads and the lateral confinement of the leads coaxially of the leads and simultaneously spreading successive immediately adjacent portions of the leads exiting from the confined area to the first predetermined angular displacement so that only those successive portions of the leads extending from the confined area are being spread.

3. The method as set forth in claim 1 including the step of:

confining portions of the leads adjacent to the article against lateral movement after successive free end and intermediate portions of the leads have been formed to the first predetermined angular displacement so that the confined portions of the leads which extend from the article in an original orientation are precluded from moving laterally while the free end and intermediate portions are being spread to a second predetermined angular displacement.

4. A method of forming leads extending from an article, which comprises the step of:

moving leads of an article through a confined space so that successive portions of the leads are precluded from moving laterally as they are passed through the confined space, spreading successive free end and intermediate portions of the leads as the leads exit from the confined space to form the leads at a first predetermined angular displacement with respect to the article so that a preliminary bend is formed in each of the leads in preparation for additional forming of the leads, spreading at least intermediate and free end portions of the leads to a second predetermined angular displacement with respect to the article, and bending the free end portions of each of the leads to a predetermined angular displacement with respect to the associated intermediate portions of the associated lead so that the free end portions of each of the leads extend in a desired direction with respect to the article.

5. The method as set forth in claim 4 including the step of:

confining portions of the leads adjacent to the article against lateral movement after successive free end and intermediate portions of the leads have been formed to the first predetermined angular displacement so that the confined portions of the leads which extend from the article in an original orientation are precluded from moving laterally while the free end and intermediate portions are being spread to a second predetermined angular displacement.

6. The method as set forth in claim 4 which includes the step of:

cutting extreme ends of the free end portions of the leads after the free end portions of the leads have been bent so that leads of a predetermined length and a desired orientation are formed with respect to the article.

7. A method of forming at least a pair of leads extending from a common base of a transistor, which comprises the steps of:

moving leads which extend from a common base of a transistor through a confined space so that successive portions of the leads are precluded from moving laterally as they are passed through the confined space, spreading successive free end and intermediate portions of the leads as the leads exit from the confined space to form the leads at a first predetermined angular displacement with respect to the transistor so that a preliminary bend is formed in each of the leads in preparation for additional forming of the leads, confining portions of the leads adjacent to the transistor after the free end and intermediate portions of the leads have been formed to the first predetermined angular displacement so that the confined portions of the leads are precluded from moving laterally, spreading at least intermediate and free end portions of the leads to a second predetermined angular displacement with respect to the article, bending the free end portions of each of the leads to a predetermined angular displacement with respect to the associated intermediate portions of the associated lead so that the free end portions of each of the leads extend in a desired direction with respect to the transistor, and cutting the extreme ends of the free end portions of each of the leads after the free end portions have been bent to form leads of a predetermined length and a desired orientation with respect to the transistor.

8. An apparatus for forming leads extending from articles, which comprises:

means for spreading successive free end and intermediate portions of the leads to a first predetermined angular displacement with respect to the article so that a preliminary bend is formed only in and lateral stresses of spreading are applied only to the successive free end and intermediate portions of the leads in preparation for additional forming of the leads, means for spreading intermediate and free end portions of the leads to a second predetermined angular displacement with respect to the article whereby any lateral movement of the lead is limited to the intermediate and free end portions of the leads, and means for bending the free end portions of the leads to a predetermined angular displacement with respect to the associated intermediate portions of the leads so that the free end portions of the leads extend in a desired direction with respect to the article.

9. The apparatus as set forth in claim 8 including:

means for confining successive free end and intermediate portions of the leads against lateral movement, progressing from the free end portions of the leads toward the article, as relative movement of the leads and the lateral confinement of the leads coaxially of the leads occurs simultaneously with the spreading of successive immediately adjacent portions of the leads exiting from the confined area so that only those successive portions of the leads extending from the confined area are being spread to the first predetermined angular displacement.

10. The apparatus as set forth in claim 8 including:

means for confining portions of the leads adjacent to the article after successive free end and intermediate portions of the leads have been formed to the first predetermined angular displacement so that the confined portions of the leads which extend from the article in an original orientation are precluded from moving laterally while the free end and intermediate portion of the rod toward the one end of the mined angular displacement.

11. The apparatus as set forth in claim 8 including:

means for cutting extreme ends of the free end portions of the leads after the free end portions of the leads have been bent so that leads of a predetermined length and a desired orientation are formed with respect to the article.

12. The apparatus as set forth in claim 8 wherein the means for spreading the leads to a first predetermined angular displacement includes:

a rod having grooves formed in one end thereof parallel to the axis of the rod, the base walls of the grooves being tapered inwardly from an intermediate portion of the rod toward the one end of the rod at a predetermined angle so that, as the successive free end and intermediate portions of the leads are moved through the grooves from the one end, the free end and intermediate portions of the leads as formed at the first predetermined angular displacement with respect to the article.

13. The apparatus as set forth in claim 8 wherein the means for spreading the leads to a second predetermined angular displacement includes:

a movable member having a bevelled edge formed at a predetermined angle on one surface thereof which is movable relatively into engagement with the free end and intermediate portions of the leads which have been formed to the first predetermined angular displacement to spread the portions of the leads to the second predetermined angular displacement which coincides with the predetermined angle of the bevelled edge of the movable member, and means for moving the movable member so that the bevelled edge of the member engages and spreads the intermediate and free end portions of the leads to the second predetermined angular displacement with respect to the article.

14. The apparatus as set forth in claim 8 wherein the means for bending the free end portions of the leads includes:

a movable member having a central opening formed therein, a fixed member for supporting the intermediate portions of the leads in the second angular displacement with the free end portions extending from the fixed member, and means for moving the movable member over the fixed member so that the walls of the central opening engage the extended free end portions of the leads and bend the leads at a predetermined angle with respect to the associated intermediate portions of the leads and along the fixed member.

15. The apparatus as set forth in claim 10 wherein the means for confining portions of the leads includes:

a first fixed member having a bore formed therethrough, a plurality of notches formed in the wall of the bore and parallel to the axis of the bore for receiving the portions of the leads to be confined, and a second fixed member positioned centrally within the bore and spaced from the walls of the bore to permit the confined portions of the leads to be positioned within the notches of the bore and confined within a space defined by the notches of the wall of the bore of the first fixed member and the adjacent surfaces of the second fixed member.

16. An apparatus for forming leads extending from a common base of a transistor, which comprises:

a first fixed member having grooves formed in the outer surfaces of one end thereof parallel to the axis of the member, the grooves tapering outwardly from the one end of the fixed member to an intermediate portion thereof, a second fixed member having a bore formed therein, the walls of the bore formed with notches which are parallel to the axis of the bore, the grooved end of the first fixed member extending into the bore of the second fixed member with each of the notches of the bore spaced from and adjacent to an associated one of the tapered grooves of first fixed member so that, as successive free end and intermediate portions of the leads of the transistor are inserted into the notches of the bore, the successive inserted portions are confined in a space defined by the notches of the bore and the tapered grooves as the successive portions pass therethrough, the free end and intermediate portions of the leads being spread to a first predetermined angular displacement with respect to the transistor as they exit from the space and are moved along the tapered grooves, a first means movable with respect to the first fixed member for engaging and spreading the free end and intermediate portions of the leads to the second predetermined angular displacement with respect to the transistor, means movable with respect to the first movable means for engaging and bending the free end portions of the leads to a predetermined angular displacement with respect to the associated intermediate portions of the leads, and means for cutting the extreme ends of the free end portions after the free end portions have been bent to the predetermined angular displacement with respect to the associated intermediate portions of the leads to form leads of a desired orientation and predetermined length with respect to the transistor, the portions of the leads adjacent to the common base of the transistor being confined within associated spaces defined by the notches of the bore of the second fixed member and the adjacent portion of the tapered grooves of the first fixed member to preclude lateral movement of the adjacent portions of the leads when the free end and intermediate portions are being formed and cut.

References Cited

UNITED STATES PATENTS

| | | | |
|---|---|---|---|
| 3,147,779 | 9/1964 | Brown | 140—105 |
| 3,427,849 | 2/1969 | Ainsworth et al. | 140—105 |
| 3,447,575 | 6/1969 | Johanson | 140—106 |

LOWELL A. LARSON, Primary Examiner

U.S. Cl. X.R.

140—105

L-566-PT
(6-69)

UNITED STATES PATENT OFFICE
CERTIFICATE OF CORRECTION

Patent No. 3,515,175 Dated June 2, 1970

Inventor(s) William W. Hudson

It is certified that error appears in the above-identified patent and that said Letters Patent are hereby corrected as shown below:

Column 3, line 54, "upoperated" should read --unoperated--. Column 9, lines 55 and 56, "ar- which will embody the principles of the invention." should read --arrangements are simply illustrative of the invention.--. Column 11, lines 74 and 75, "portion of the rod toward the one end of the mined" should read --portions are being spread to a second predetermined--.

SIGNED AND SEALED
OCT 20 1970

(SEAL)
Attest:

Edward M. Fletcher, Jr.
Attesting Officer

WILLIAM E. SCHUYLER, JR.
Commissioner of Patents